Sept. 5, 1933.　　　　J. ROBINSON　　　　1,925,724
AUTOMATIC TRAIN PIPE CONNECTER
Original Filed March 22, 1930
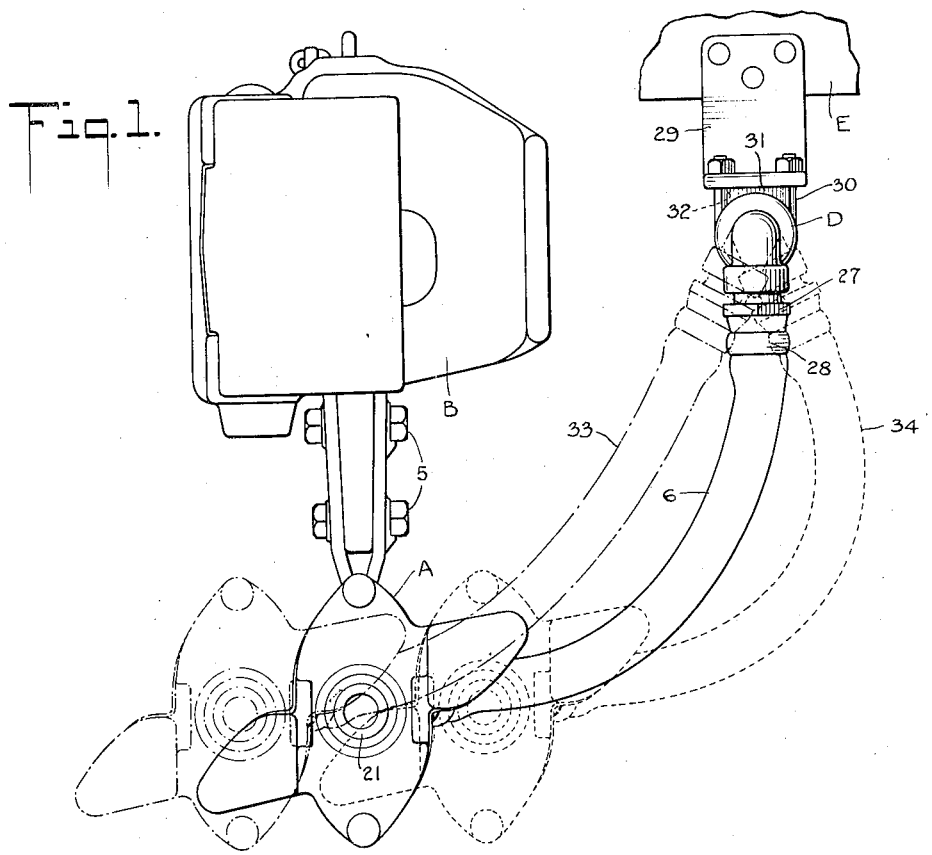
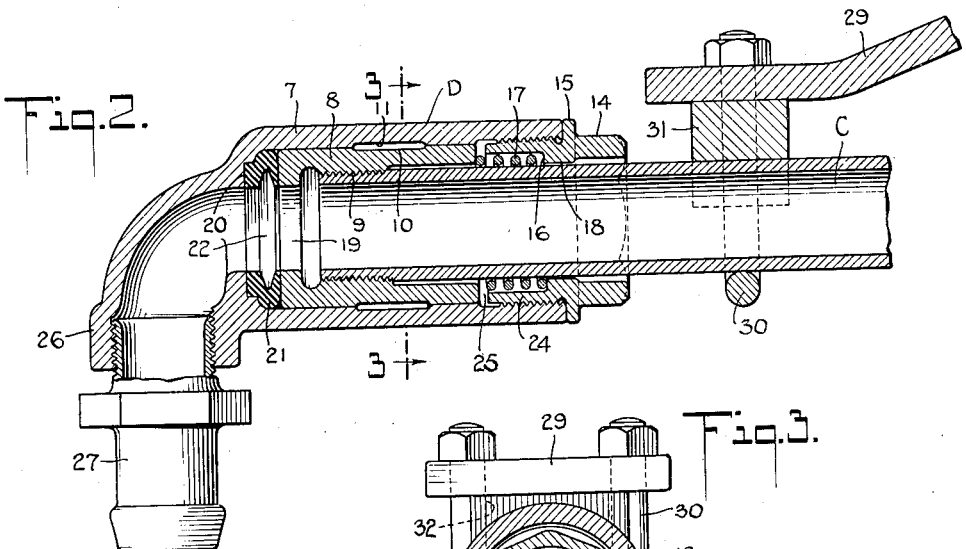
INVENTOR
Joseph Robinson
BY
ATTORNEYS Patented Sept. 5, 1933

1,925,724

UNITED STATES PATENT OFFICE 1,925,724

AUTOMATIC TRAIN PIPE CONNECTER

Joseph Robinson, New York, N. Y.

Application March 22, 1930, Serial No. 438,194
Renewed January 26, 1933

5 Claims. (Cl. 285—9)

This invention relates to automatic train pipe connecters, and more particularly to means for connecting the hose of such connecters to the train pipe of the car. Among the objects is to provide an improved connection of this kind which is flexible or swiveled to permit maximum swing of the hose without kinking or subjecting the hose to undue strains. On practically all railway cars a metallic train pipe is mounted on the car and to each end of this train pipe a flexible non-metallic hose such as a rubber hose is attached. The connection between the train pipe at each end of the car and the hose is located in a standard position with respect to the longitudinal center line and the pulling face of the car coupler. On freight cars, in particular, the train pipe is rigidly anchored to a part of the car body and therefore cannot move to accommodate itself to the various positions the car coupler assumes in service. The shifting of the car coupler does not particularly affect the train pipe hose when coupled together by means of the present hand operated coupling, but when an automatic connecter is applied to the coupler, and the lower end of the hose is secured to the connecter, then the shifting of the coupler has a distinct effect upon the hose. As the connecter follows the coupler, the lower end of the flexible train pipe hose must follow the connecter and in consequence the hose is subjected to strain when the coupler shifts an extreme distance in one direction, and is kinked when the coupler shifts an extreme distance in the other direction. My invention eliminates this strain and kinking of the hose and not only greatly prolongs the life of the hose, increases safety by minimizing bursted hose, but also maintains the air brake operation at a higher efficiency by preventing hose kinks which always obstruct the flow of air through the air brake system.

In the accompanying drawing Figure 1 is a front elevation of a car coupler and an automatic connecter applied thereto with the hose attached to the train pipe by means of my improvement;

Figure 2 is a longitudinal sectional view through my improved swiveled hose connection or union, and Figure 3 is a cross sectional view on the line 3—3 of Figure 2.

My improvement may be used with any type of automatic connecter A suitably secured to the car coupler B, or other part of a car, by means of bolts or rivets 5. The lower end of the usual flexible train pipe rubber hose 6 may be secured in any desired manner to the connecter. The upper end of the hose is anchored to the usual train pipe C by my improved flexible coupling or union D which consists of a tubular member or housing 7 rotatably mounted on a bushing or bearing 8. The bushing is threaded or otherwise secured to the train pipe C as at 9 and is preferably of different non-corrosive material than the housing 7, such for instance as bronze. The bushing is sufficiently long to give the housing a rugged substantial bearing, the mating surfaces of the housing and the bushing being machined fitted and being separated by annular grooves 10 and 11. The bushing 8 adjacent the groove 10 is octagonal in cross section as shown at 12 in Figure 3 to facilitate assembly of the sleeve 8 on the pipe line C. At its rear end the housing is threaded to receive the nut 14, a shoulder or flange 15 being provided on the nut to limit the forward position of the nut in the housing 7. Within the nut, and bearing against the shoulder 16 thereof, I provide a coiled spring 17 the purpose of which will be later described. It will be observed that the train pipe C passes through the nut 14 and fits the latter quite snugly as at 18.

At its forward end I provide the bushing 8 with an inwardly extending bearing or lip 19 and in front of this bearing, and on the inner walls of the housing 7, I provide a seat 20 for an expansible gasket 21. This seat preferably conforms to the outline of the gasket, and the gasket is grooved at 22 to admit the air between the flanges thereof formed by such groove, and thus expand the gasket into tight engagement with its seat on the housing 7 and the bushing 8. More specifically speaking the seats 19 and 20 on the housing and the bushing form the gasket seat. It will be noted that between the shank 24 of the nut 14 and the rear end of the bushing 8 a space is provided as at 25. This space is relatively slight. When the air or fluid carried strikes the gasket 21 and expands the same the bushing is drawn forward slightly bringing the shank 24 of the nut into engagement with the rear face of the bushing 8. The longitudinal movement of the housing 7 on the bushing is not sufficient to produce any likelihood of leakage at the gasket joint. When there is no fluid pressure in the train pipe C, the spring 17 draws the housing rearwardly with sufficient resistance to always keep the gasket firmly against this seat, thus preventing any likelihood of leakage occurring around the gasket 21 at the moment of application of fluid to the train pipe.

At its forward end the housing 7 is provided with an elbow 26, preferably integral with the housing, which turns downwardly to the horizontal plane. The lower end of the elbow is preferably enlarged and threaded to receive the usual hose nipple 27 which is mounted in the upper end of the hose 6 as by the usual clamp 28.

To rigidly anchor the train pipe C to the car body E, I provide a forwardly extending rugged bracket 29 perforated to receive a U-bolt 30 which embraces the train pipe. A spacer-block or jaw 31 is interposed between the train pipe and the underside of the forward end of the bracket. The spacer-block spans a part of the train pipe and is grooved in either side to receive a part of the diameter of the U-bolt as shown at 32 in Figures 1 and 3.

It will be understood from the foregoing description that my improved coupling or union is flexibly or rotatably mounted upon the front end of the train pipe C and that when the connecter moves to an extreme lateral position, the coupling rotates on the bushing 8 thus preventing the hose from being severely strained at the connection between the hose and the nipple 27. This freedom of movement to the left is indicated by the dot and dash lines 33 in Figure 1. Likewise when the connecter is moved to the opposite position, shown by dotted lines 34 in Figure 1, the coupling or housing 7 rotates on its bearing 8 on the train pipe C to permit the hose to bend or yield throughout its full length instead of localizing the bending strains at the center of the hose. The result is preservation of the hose and an unobstructed opening throughout the hose at all times, which permits a uniform rate of speed for the flow of the air through the train pipe, unimpaired by hose kinks or hose with inner linings ruptured. Kinked hose and ruptured inner linings occur frequently with connecter hose that are attached to the train pipe through the medium of the present rigid angle cock.

As will be noted from the drawing no angle cock is shown. Some railroads have dispensed with its use. But if it is desired to have a valve in the train pipe C to control the flow of the fluid therethrough I mount the same at the rear of the U-bolt. Such valve may be of any suitable construction. If however it is desired to continue the use of the present or similar angle cock, and at the same time secure the benefits of my improvement, then the angle cock is made an integral part of, or is otherwise secured to, the housing 7 of my invention in lieu of the elbow 26. A desirable form of angle cock is shown by the co-pending application of Frank T. Slayton for improvements in angle cocks used on the ends of railway cars, Serial #435,920 filed March 14, 1930, now Patent Number 1,842,211, granted Jan. 19, 1932 and assigned to me. While the gasket or packing 21 may be of any desired shape and material I preferably use a rubber gasket of the same material and design as the gasket used at the face of the connecter head—see Figure 1. If desired, a solid packing of suitable material may be substituted for use in my improved coupling in lieu of the gasket 21, in which case the spring 17 should be heavier in order to constantly draw the solid packing into air tight engagement with its seat on the housing 7 and the sleeve 8 and to automatically take up any wear thereon.

What I claim is:

1. Means for connecting a flexible hose to the train pipe of a car so as to permit lateral movement of the hose relative to the train pipe without flexing of the hose, said means including a sleeve connected to said train pipe and having an annular groove intermediate its ends, a housing surrounding said sleeve and mounted for rocking movement thereon, said coupling having at its front end an elbow to which the upper end of said train pipe hose is connected and having at its rear end a threaded portion, a spring surrounding said train pipe and bearing against the rear end of said sleeve, a stop threaded into the rear end of said housing and embracing said spring, and a packing between said sleeve and said housing and held constantly in air tight engagement therewith by said spring for sealing the joint between said sleeve and said housing.

2. Means for connecting the movable hose of a car to a stationary train pipe on the car, said means comprising a member connected to the hose, said member forming a housing for the end of the train pipe, a sleeve mounted on the end of the train pipe and surrounded by said housing, said housing being rotatable relative to said sleeve, a nut surrounding said pipe and threadedly connected to said housing, a spring arranged between said nut and said sleeve whereby said housing and sleeve are forced toward each other, and a packing arranged between the end of said sleeve and said housing.

3. Means for connecting the movable hose of a car to a stationary train pipe on the car, said means comprising a member connected to the hose, said member forming a housing for the end of the train pipe, a sleeve threaded onto the end of said train pipe and arranged within said housing, said housing being rotatable relative to said sleeve, a nut surrounding said pipe and extending into said housing and threadedly connected thereto, a spring surrounding said pipe and arranged between said nut and said sleeve, whereby said housing and sleeve are drawn toward each other, and a packing arranged between the inner end of said sleeve and said housing.

4. A pipe connection of the kind described comprising two parts, one part having a housing and the other part having a sleeve arranged within the housing, said housing and sleeve being rotatable relative to each other, a nut threadedly engaging the end of said housing and surrounding the other part of said connection, a spring arranged between said nut and said sleeve whereby said housing and sleeve are forced longitudinally relative to each other, and a packing arranged between the end of said sleeve and said housing.

5. A pipe connection of the kind described comprising a member having a sleeve rigidly secured on the end thereof, a second member having a housing surrounding said sleeve, said sleeve and housing being rotatable relative to each other, a nut mounted on said housing and surrounding said first named member, a spring arranged between said nut and said sleeve and serving to force said sleeve inwardly of said housing, and packing means between the inner end of said sleeve and said housing.

JOSEPH ROBINSON.